J. O. ANDERSON.
MECHANIC'S TOOL.
APPLICATION FILED MAY 5, 1904.

923,313.

Patented June 1, 1909.

Witnesses:

Inventor:
John O. Anderson
By R. J. Jacker
Atty.

UNITED STATES PATENT OFFICE.

JOHN O. ANDERSON, OF CHICAGO, ILLINOIS.

MECHANIC'S TOOL.

No. 923,313.　　　　Specification of Letters Patent.　　　　Patented June 1, 1909.

Application filed May 5, 1904. Serial No. 206,584.

*To all whom it may concern:*

Be it known that I, JOHN O. ANDERSON, a citizen of the United States, residing at Chicago, in the county of Cook and State of Illinois, have invented a new and useful Mechanic's Tool, of which the following is a specification.

My invention relates to improvements in mechanics' tools in which a movable graduated segment or protractor operates in conjunction with a stationary protractor provided with a center socket or depression; and the objects of my improvement are, first, to provide a novel construction of bearing for the movable protractor; second, to afford facilities for determining centers of circles, dividing a circle into any certain number of parts, and determining the degree of an angle; third, to provide means for securing a straight edge to the instrument for certain purposes; and other objects which will become apparent from the description to follow. I attain these objects by the construction illustrated in the accompanying drawing.

This tool is capable of being used in a great many ways and I have not attempted to illustrate the device in use, but will enumerate here a number of uses to which it can be put viz: for laying off any given number of holes in a given circle; to determine the distance between holes equally spaced about a circle; to find the correct position of keyways cut on an angle to the center line; for laying off circles on work to be machined which has a core or other hole which would require a false center; to determine the degree of angles; to find the center of a shaft, or circle; to strike a circle of a given diameter about a raised hub or boss; and to determine a given axis of a bore in a sphere.

Figure 1:
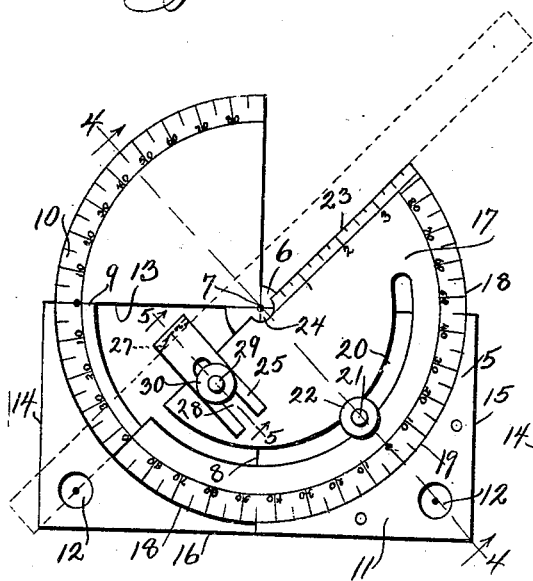
Figure 2:
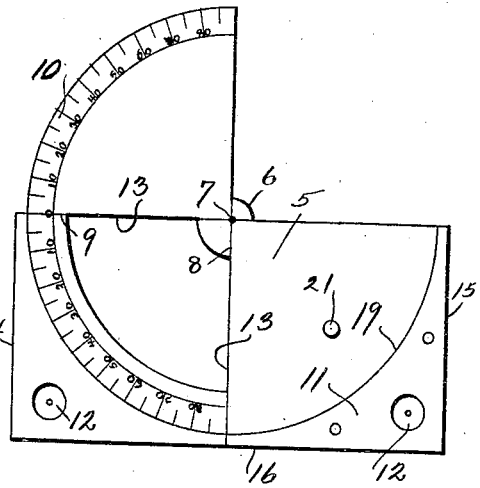
Figure 3:
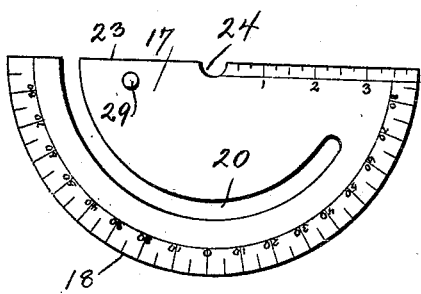
Figure 4:
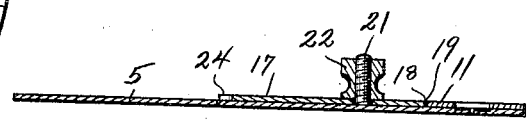
Figure 5:
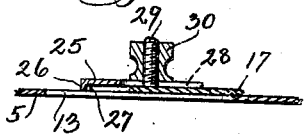

Referring to the drawing Figure 1— is a plan of a tool embodying my invention; Fig. 2— is a plan of the stationary portion of the tool; Fig. 3— is a plan of the movable protractor forming a part of my invention; Fig. 4 is a section on 4—4 of Fig. 1— and Fig. 5— is a section on 5—5 of Fig. 1—.

Similar reference characters refer to similar parts throughout the several views.

The base plate or frame 5— of the device is made of a square piece of sheet metal having one quarter of the square in a corner cut away on a right angle, with the exception of a small segmental portion 6 near the center. The portion 6 is left to provide for the center punch of hole 7 made at the intersection of the two center lines 8 and 9.

A semicircular degree graduated scale 10, is provided on one side of the plate 5— having the line 8 as a base. The portion of the plate 5— on the other side of the line 8 has a plate 11— riveted or otherwise secured thereto, whose one edge 19— is cut in the arc of a circle concentric with the center 7, and in line with the arc of the scale 10.

The countersunk holes 12 having small central perforations are provided in the plate 5 in any convenient location for the reception of thumb tacks when it is desired to fasten the tool to a board, block or drawing.

A segmental portion of the plate 5— between the lines 8 and 9 is preferably cut out as at 13—. The peripheral edges 14 and 15 of the plate 5 are parallel with the line 8, while the edge 16 is at right angles thereto and is parallel with line 9. That portion of the plate 5 above line 9 and outside of the scale 10 may also be cut away to lessen the weight of the instrument.

The semicircular disk or protractor 17 is of such size that its circular edge 18 coincides with the scale 10 when it is in position concentric with the center 7 on the plate 5. This circular edge 18 also fits against the edge 19— of the plate 11 which serves as a guide to retain the protractor 17 always concentric to the center 7. The protractor 17 is provided with a circular slot 20 concentric with the edge 18 arranged to straddle over a threaded post 21 secured to the plate 5. A thumbnut 22 is screwed on the post 21 and against the face of the segment 17 to securely hold it from movement. The segment 17 is provided with the straight edge 23, one half of which is preferably graduated; while in the middle of the edge 23— is a small notch 24 for the purpose of leaving the center 7 always exposed.

By the construction described it will be seen that when the thumb-nut 22 is loosed, the segment 17 can be swung about the center 7 in an arc of about 95 degrees while being guided by the edge 19 of the plate 11, and can be clamped in any desired position by screwing down the nut 22—.

To accomplish some of the work mentioned above it is necessary to extend the straight edge 23 beyond the edge of the instrument, and this is done by simply holding a straight edge rule against the edge 23 as shown by dotted lines in Fig. 1—.

To hold a straight edge rule firmly against the edge 23 and still allow the longitudinal movement of the rule I provide a clamping plate 25— having the downwardly bent end provided with a leaf spring 27 to bear against the edge of the rule.

To facilitate the adjustment of the clamp 25 to any width of rule it has a slot 28— which straddles a threaded post 29— extending up from the face of the segment 17— near the edge 23— and a thumb-nut 30— is provided on the post 29— to be screwed against the plate 25— and clamp it in any desired position.

This tool can be used by draftsmen and engineers for laying out work as well as by mechanics.

Having thus fully described my invention what I claim as new and desire to secure by Letters Patent of the United States is—

1. In a tool, the combination of a sheet metal plate provided with a center hole and a graduated scale concentric to said center and a second semicircular sheet metal plate guided to slide on the first named plate provided with a graduated scale concentric to said center and means for clamping the said two plates together.

2. The combination of a sheet metal plate provided with a center hole, a semicircular graduated scale concentric to said center, a one quarter segmental notch and two adjoining right angles having their edges outside of said scale and a second sheet metal plate of semicircular form arranged to slide on the first named plate in a path concentric to said center, provided with a semicircular graduated scale, means for guiding said plate in said path and means for clamping the two plates together.

3. The combination of a plate provided with a center hole, a semicircular graduated scale concentric to said center, a one quarter segmental notch concentric to said center, two adjoining right angles having their edges tangent to a circle drawn from said center, two perforations for thumb tacks, a semicircular guide plate concentric with said center and a threaded post provided with a nut; and a second plate of semicircular form provided with a semicircular graduated scale, a straight graduated scale, an arcuate slot for the reception of said threaded post, a notch to permit the constant exposure of said center hole and a screw threaded post provided with a nut for clamping a plate thereto.

4. In a tool, the combination of a sheet metal plate provided with a center hole, a graduated scale concentric to said center and a one-quarter segmental notch and a second sheet metal plate guided to slide on the first named plate in a path concentric to said center provided with a graduated scale concentric to said center and means for clamping the two plates together.

5. In a tool, the combination of a sheet metal plate provided with a center hole, a graduated scale concentric to said center and two adjoining right angles having their edges outside of said scale and a second plate guided to slide on the first named plate in a path concentric to said center provided with a graduated scale concentric to said center and means for securing the plates together.

6. In a tool, the combination of a sheet metal plate provided with a center hole, a graduated scale concentric to said center, a one-quarter segmental notch and two adjoining right angles having their edges outside of said scale and a second sheet metal plate guided to slide on the first named plate in a path concentric to said center provided with a graduated scale concentric to said center and means for securing the said two plates together.

7. In a tool the combination of a sheet metal plate provided with a center hole and a semicircular graduated scale concentric to said center and a second semicircular sheet metal plate guided to slide on the first named plate in a path concentric to said center provided with a graduated scale concentric to said center and means for clamping the said two plates together.

In testimony whereof I have signed my name to this specification in the presence of two subscribing witnesses, this 29th day of April 1904, at Chicago Illinois.

JOHN O. ANDERSON.

Witnesses:
R. J. JACKER,
CARL O. ANDERSON.